United States Patent
Klein et al.

(10) Patent No.: US 7,044,153 B2
(45) Date of Patent: May 16, 2006

(54) VARNISHING INSTALLATION

(75) Inventors: Udo Klein, Dietzenbach (DE); Joachim Kunkel, Rothenbuch (DE); Winfried Ott, Rodgau (DE); Stephan Templin, Offenbach (DE)

(73) Assignee: LacTec Gesellschaft für moderne Lackiertechnik mbH, Rodgau (DE)

( * ) Notice: Subject to any disclaimer, the term of this patent is extended or adjusted under 35 U.S.C. 154(b) by 273 days.

(21) Appl. No.: 10/626,167

(22) Filed: Jul. 23, 2003

(65) Prior Publication Data

US 2004/0194823 A1  Oct. 7, 2004

(30) Foreign Application Priority Data

Aug. 1, 2002  (DE) ................. 102 35 102

(51) Int. Cl.
*F16K 3/02* (2006.01)

(52) U.S. Cl. .................. 137/244; 137/242; 118/70

(58) Field of Classification Search ........... 137/244, 137/245, 242; 118/70
See application file for complete search history.

(56) References Cited

U.S. PATENT DOCUMENTS 2,481,760 A * 9/1949 Leher ..................... 392/476
4,546,788 A * 10/1985 Stalder et al. ............ 137/242
5,255,848 A    10/1993 Rhodehouse
6,725,875 B1 * 4/2004 Mollard .................. 137/244

FOREIGN PATENT DOCUMENTS

| DE | 2064238     | 8/1971  |
| DE | 4115492     | 11/1992 |
| DE | 199 62 224 A1 | 7/2001 |
| EP | 0904848     | 3/1999  |
| EP | 1186349     | 3/2002  |
| WO | 0110564     | 2/2001  |

* cited by examiner

*Primary Examiner*—Kevin Lee
(74) *Attorney, Agent, or Firm*—Friedrich Kueffner

(57) ABSTRACT

A varnishing installation includes a varnish line with an inlet end, an outlet end and an auxiliary device. The auxiliary device is connected through a valve arrangement to the varnishing line and the valve arrangement is scrapeable.

14 Claims, 2 Drawing Sheets

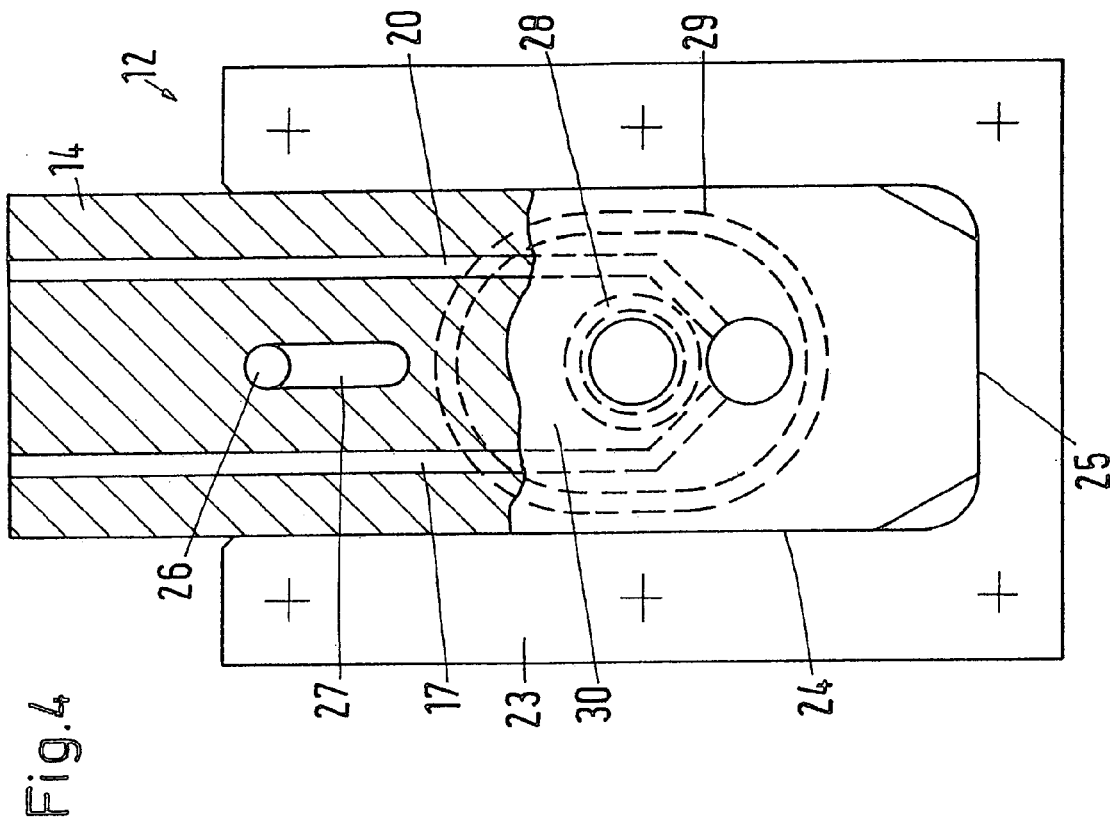
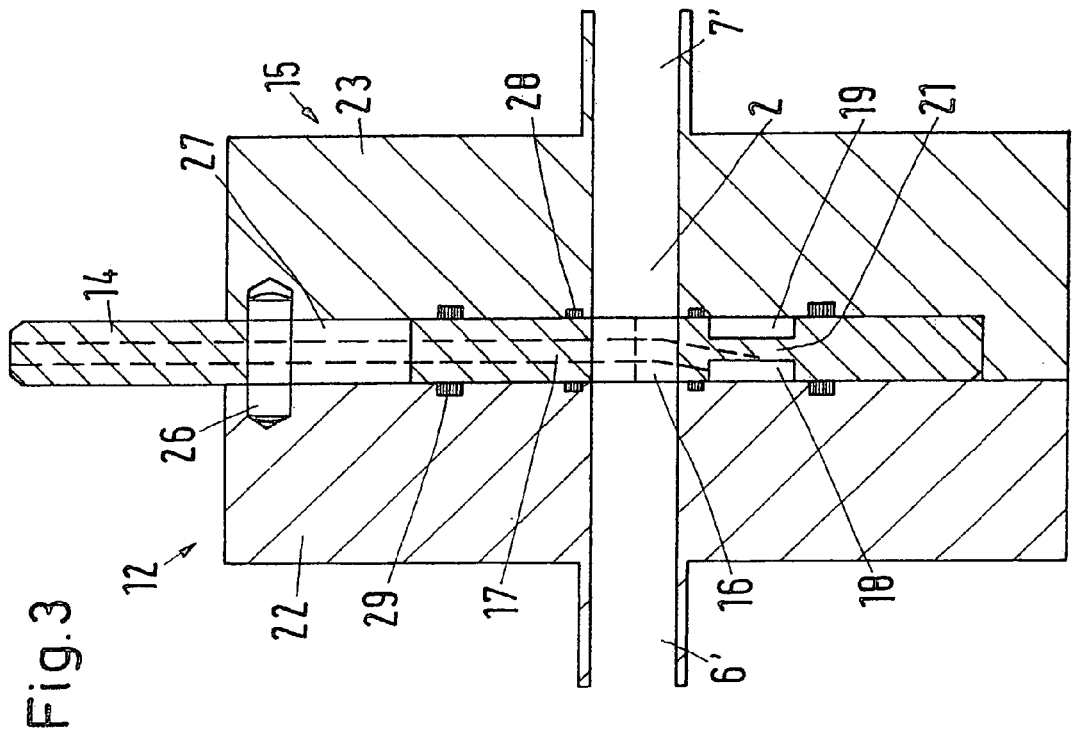

VARNISHING INSTALLATION

BACKGROUND OF THE INVENTION

1. Field of the Invention

The present invention relates to a varnishing installation having a varnish line with an inlet end, an outlet end and an auxiliary device.

2. Description of the Related Art

Before cleaning a varnish line, it is in many cases desirable to recuperate any varnish residues in the varnish line which have been left over from a previously carried out varnishing process. Used for this purpose is a so called scraper which is pushed through the varnish line against the direction of flow of the varnish during varnishing. The scraper rests against the inner side of the varnish line and at least substantially "scrapes" clean the inner wall of the line. Of course, in addition to the recuperation of varnish residues which remain after a varnishing process at the inner wall of the varnish line, the use of a scraper for precleaning the varnish line also has the advantage that during a subsequent rinsing process less rinsing agent will be needed and the rinsing agent is only contaminated to a small extent.

The use of a scraper is primarily advantageous if a frequent change of color is to be carried out during the varnishing of structural components. This situation occurs frequently in the automobile industry. In that case, the varnish line is arranged between a source which is frequently formed by a ring line arrangement in which several color lines are arranged in a ring shape, and wherein a specific varnish is circulated in each color line. These color lines supply a so called color changer from which the color varnish intended for the varnish application is supplied to the atomizer within the varnishing cabin. The outlet end of the varnish line between the color changer and the atomizer is then located in a varnishing cabin in which the actual varnish application takes place.

The use of a scraper and a scrapeable line is known.

However, an auxiliary device is necessary in many varnish lines. This auxiliary device may have various configurations. For example, the auxiliary device may be a pump which raises the pressure of the varnish between the inlet end and the outlet end in order to facilitate varnishing by means of a spray application at a higher pressure. In accordance with another embodiment, the auxiliary device may be a high-voltage arrangement which serves to raise the electrical potential of the varnish. These two embodiments are merely examples.

When such an auxiliary device is provided in the varnish line, the use of a scraper becomes more difficult. The auxiliary device usually has many difficult locations, i.e., corners and edges, so that the scraper would be damaged if it were moved through the auxiliary device. Also, in many cases the free cross-sectional area of the varnish line is reduced, for example, when the auxiliary device is a gear pump.

Therefore, depending on the arrangement of the auxiliary device, precleaning of the varnish line by means of a scraper must be terminated in front of or behind the auxiliary device. This means that an area remains between the auxiliary device and the inlet end in which the varnish cannot be removed. As an alternative, the application of the scraper is restarted in this area, or scrapers are used which are allowed to wear quickly.

SUMMARY OF THE INVENTION

Therefore, it is the primary object of the present invention to provide a varnishing installation in which as little varnish as possible is lost during cleaning.

In accordance with the present invention, in a varnishing installation of the above-described type, the auxiliary device is connected through a valve arrangement to the varnishing line and the valve arrangement is scrapeable.

As a result of the configuration according to the present invention, the varnish line can be completely scraped from the outlet end to the inlet end, i.e., the line can be precleaned by means of a scraper. During this precleaning procedure, the auxiliary device is moved by means of the valve arrangement out of the path of the scraper through the varnish line. In other words, the auxiliary device is moved out of the path of the scraper. The valve arrangement itself is scrapeable, i.e., a scraper can travel through the valve arrangement in a position in which the auxiliary device is no longer in the flow path of the varnish; according to the present invention, the scraper can be moved through without damaging the valve arrangement. On the other hand, the valve arrangement can also be switched into a position in which the varnish, which flows from the inlet end to the outlet end, can flow through the auxiliary device. A scraper can usually not be used in this position of the valve arrangement. However, this is not necessary because in this position of the valve arrangement the varnish is supposed to flow from the inlet end toward the outlet end of the varnish line and not in the opposite direction. In this mode of operation, the varnish is intended to be conveyed to the atomizer and the line is not to be emptied. When the valve arrangement is switched in such a way that the scraper can travel through, some varnish will remain in the auxiliary device. This varnish can be removed by a subsequent rinsing process. As a result of this process, a certain quantity of varnish is lost. However, this loss is small and, therefore, acceptable.

The valve arrangement can preferably be switched into a scraping position in which it forms a passage between two portions of the varnish line whose walls are smooth. When the valve arrangement is switched in such a way that the scraper can travel therethrough, then the valve arrangement is in the so called "scraping position". In this scraping position, the passage actually forms an integral component of the varnish line, i.e., the scraper can be pushed from a section of the varnish line which is located adjacent to the outlet end to a section of the varnish line which is located adjacent to the inlet end, without having to overcome structures in the wall of the line which could possibly damage the scraper. A scraper usually has lips which rest against the inner wall of the varnish line. These lips are endangered, for example, if they have to travel across an opening in the inner wall of the varnish line. Such a danger does not exist in the valve arrangement. In the scraping position, the passage between two sections of the varnish line is smooth, i.e., the valve arrangement also does not have any lateral branches from the varnish line when the valve arrangement is in the scraping position.

The passage preferably has at each end thereof the same cross-section as the portion of the varnish line connected to the respective end. The transition from the portion of the varnish line is without steps and smooth. Consequently, the scraper will not encounter any changes which could damage the scraping lips. Simultaneously, the fact that the cross-sections are constant also means that no dead spaces are created in which the scraper could not properly scrape.

The valve arrangement preferably includes a slide valve with a slide moveable in a housing, wherein the slide has a through opening which forms the passage. The slide can now be moved in such a way that its through opening is in alignment with the cross-section of the varnish line. This is the scraping position referred to above. In this case, the scraper arriving from the varnish line can enter the through opening and the scraper can again leave the through opening as it is moved into the other section of the varnish line. In another position of the slide, the scraper cannot travel through the valve arrangement. However, in that case the slide forms paths in the line to the auxiliary device through which the varnish can flow from the inlet end to the outlet end.

In accordance with a particularly preferred feature, the through opening is connected to the varnish line without a gap. "Without a gap" refers to a configuration in which any unevenness at the transition between the varnish line and the through opening is so small that there is practically no danger that the scraper will be damaged. In other words, it is technically not possible to avoid gaps in the physically precise sense. However, the gaps are so small or have such a low depth that the lips of the scraper are not impaired by the gaps.

In accordance with a preferred feature, at least one branch line is formed in the slide, wherein, in an operating position of the slide, the branch line is in communication with the varnish line. The branch line can be used for removing the varnish in the operating position of the slide from the varnish line and to feed the varnish back into the varnish line. The other end of the branch line is then connected to the auxiliary device, for example, the pump or the device for increasing the potential.

The slide preferably closes the varnish line when the slide is in the operating position. This forces the varnish to flow completely through the auxiliary device. This is particularly advantageous if in fact the entire quantity of varnish flowing through the varnish line is to be acted upon or treated by the auxiliary device.

In accordance with a preferred feature, two branch lines are arranged in the slide, wherein the two branch lines are in communication with the varnish line on opposite sides. In this embodiment, only a single valve is required for conducting the varnish either through the auxiliary device or for making the entire varnish line scrapeable. In this case, the forward line as well as the rearward line between the varnish line and the auxiliary device are arranged in the slide.

The branch line preferably is in communication with a blind end bore formed in the slide. This configuration provides the advantage that the opening of the branch line does not rub or grind against the housing when the slide is moved. Consequently, the opening of the branch line can be manufactured with a certain precision which is then also maintained during operation. Moreover, cleaning of the branch line by means of a rinsing liquid is then also somewhat easier.

The slide is preferably guided in the housing by means of a parallel guide means. This ensures in a simple manner that the passage in the slide can be brought into alignment with the cross-section of the varnish line.

The slide preferable includes at least one stop which is positioned in such a way that in the scraping position the passage is in alignment with a predetermined precision with the cross-section of the varnish line. Accordingly, the stop ensures that the slide can be moved into the scraping position and that after the movement of the slide there is no "step" or other unevenness between the varnish line and the passage in the slide, so that the scraper can be moved through the entire varnish line without being damaged. Normally, one stop is sufficient. However, in some cases it is advantageous to provide two or more stops in order to keep low the load acting on one individual stop.

The stop is preferably formed by a pin on which an oblong groove of the slide is guided. Of course, the pin can also extend completely through the slide. In that case, the groove is formed as an oblong hole. The oblong groove or the oblong bore have the purpose of contributing to the parallel guidance of the slide.

A sealing arrangement acting on the slide is preferably provided in the housing. The sealing arrangement is stationary in the housing. The slide moves relative to the sealing arrangement. This configuration has the advantage that the sealing can be held with greater reliability.

In accordance with a particularly preferred feature, the sealing arrangement includes a first sealing member which surrounds the ends of the varnish lien and a second sealing member which surrounds the housing area in which portions of the slide are located which are brought into alignment with the varnish line when the slide is in an adjusted position. The first sealing member seals the area between the slide and the housing during the operation of the varnish line as well as in the scraping position. The first sealing member ensures that any varnish which reaches the area between the slide and the housing during operation or during precleaning by means of the scraper, can at most penetrate to the first sealing member. This area is relatively narrowly defined. Therefore, a relatively small sealing member is sufficient for this purpose. In addition, a larger sealing member is provided which surrounds a larger area, i.e., the area in which "contaminated" portions of the slide can move, i.e., those components which are in alignment with the varnish line in the operating position and in the scraping position. In the scraping position, only the through opening is in alignment with the varnish line. However, when the slide is moved, areas in the immediate vicinity of the slide come into contact with varnish which is still present in the varnish line. The second sealing member has the purpose of preventing this varnish from contaminating the interior of the valve in those areas which later can only be rinsed with difficulties.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:
FIG. 3 is a schematic sectional view of a valve;
and
FIG. 4 shows a partially disassembled valve, shown partially in elevation.

DESCRIPTION OF THE INVENTION

Figure 1:
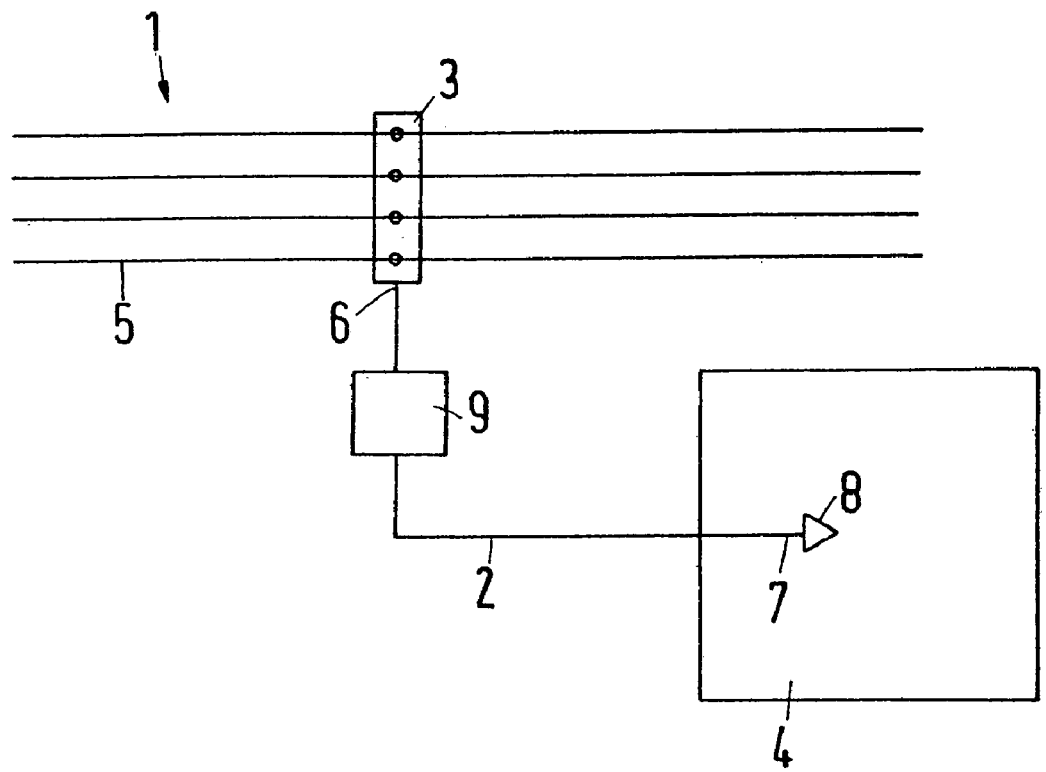
FIG. 1 is a schematic illustration of a varnish line.

FIG. 1 of the drawing shows a varnishing device 1 with a varnish line 2 which extends from a color changer 3 to an atomizer 4. The color changer 3 is connected to a plurality of ring lines 5, wherein a varnish having a certain color and/or property is circulated in each of the ring lines 5. The drawing only shows a section of the ring lines 5. The ring lines 5 are each connected to a varnish supply in a manner which is not illustrated.

The varnish line 2 has an inlet end 6 which is located adjacent the color changer 3, and an outlet end 7 which is in communication with a spray nozzle 8. However, this arrangement only serves as an example and has been selected in order to simplify the explanation.

An auxiliary device 9 is arranged in the varnish line 2. In the illustrated embodiment, the auxiliary device 9 is a pump for raising the pressure or for metering the varnish in the varnish line, so that the varnish can be sprayed by the spray nozzle 8 onto a workpiece, not illustrated in detail.

When the spraying procedure has terminated and a subsequent workpiece is to be coated with a different color or a different varnish, it is necessary to clean the varnish line 2. Cleaning of the line is supposed to make it possible that the subsequent varnishing process can be carried out with the desired varnish and that this varnish is not contaminated by residues from a previous varnishing process.

However, even after a varnishing process has been terminated, there are still relatively large quantities of the varnish in the varnish line 2 which has been used for the just concluded varnishing process. For this purpose, a so called scraper is used which travels through the varnish line from the outlet end 7. The scraper has conventional stripping members, for example, lips, not illustrated, which rest against the inner wall of the varnish line and which convey the varnish adhering to the inner wall of the varnish line 2 in the direction toward the inlet end 6 when the scraper is moved from the outlet end 7 toward the inlet end 6.

However, after a certain distance of travel of the scraper, the auxiliary device 9 presents an obstacle through which the scraper cannot be easily moved without being damaged.

Figure 2:
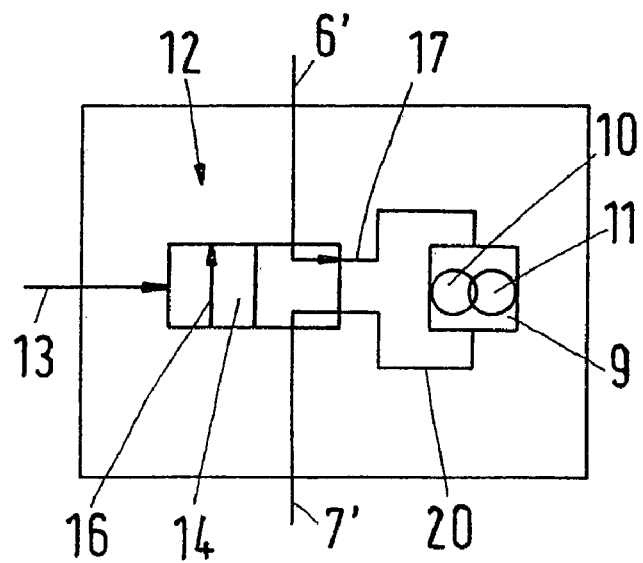
FIG. 2 as an enlarged illustration of a valve arrangement.

For this reason, as illustrated in FIG. 2, the auxiliary device 9 is connected through a valve arrangement 12 with the varnish line 2. In the illustrated embodiment, the auxiliary device 9 is a gear pump with two meshing gears 10, 11.

The valve arrangement 12 includes a slide valve with a slide 14 which is arranged in a housing 15. The slide has a through opening 16 whose cross-section precisely coincides with the cross-section of the varnish line. As illustrated in FIGS. 3 and 4, the slide 14 can be moved in such a way that the through opening 16 is in alignment with the cross-section of the varnish line 2.

The varnish line 2 has a section 6' which is located adjacent the inlet end 6, and a section 7' which is located adjacent the outlet end. The slide 14 is arranged between the two sections 6', 7'.

For precleaning the varnish line 2, the scraper is moved through the through opening 16 from the outlet end 7 toward the inlet end 6. For this reason, the through opening 16 is identified in FIG. 2 by an arrow. In the operating position illustrated in FIG. 2, varnish flows through the slide 14 in the opposite direction from the inlet end 6 toward the outlet end 7. For this reason, another arrow is shown in the bypass line 17. Both arrows indicate the direction of movement of the varnish in the slide position.

As illustrated in FIGS. 3 and 4, the bypass line 17, shown in broken lines, extends through the slide 14. The bypass line 17 essentially extends at a right angle to the varnish line 2. The bypass line 17 ends in a blind end bore 18. When the slide 14 is moved from the scraping position illustrated in FIGS. 3 and 4 into the operating position illustrated in FIG. 2, the blind end bore 18 is in alignment with the section 6' of the varnish line 2.

Arranged on the opposite side of the slide is another blind end bore 19, wherein a section 20 of the bypass line 17 ends in the blind end bore 19. This is illustrated in FIG. 4. The two blind end bores 18, 19 are in alignment, i.e., the blind end bore 19 can be placed in alignment with the section 7' of the varnish line 2. The two blind end bores 18, 19 are separated from each other by an intermediate wall 21, i.e., in the operating position illustrated in FIG. 2, the slide 14 completely blocks the varnish line 2, so that the only flow of varnish can take place through the bypass line 17 and its section 20.

The housing 15 is composed of a body 22 with a flat upper surface on which the slide 14 rests and a cover 23 with a recess 24 in which the slide 14 is laterally guided toward all sides. The cover 24 forms a parallel guide means. In addition, a lower end 25 of the recess 24 in the cover 23 forms a stop.

Also provided in the housing 15 is a pin 26, which extends through an oblong hole 27 in the slide 14. The oblong hole 27 forms together with the pin 26 a stop which can be adjusted so precisely that, in the scraping position of the slide 14 shown in FIGS. 3 and 4, the through opening 16 is in exact alignment with the cross-section of the varnish line 2.

A sealing arrangement relative to the slide 14 is provided between the body 22 and the cover 23. The sealing arrangement includes a first sealing member 28 which merely surrounds the varnish line 2 so that, in the operating position as well as in the scraping position, the sealing member substantially prevents varnish from penetrating from the varnish line 2 between the body 22 and the cover 23. The sealing arrangement further includes a second sealing member 29 which has a greater length and is arranged in such a way that it surrounds a housing area 30 in which the through opening 16 or the blind end bores 18, 19 are moved when the slide 14 is moved.

The axis of the through bore 16 extends parallel to the axis of the varnish line 2. The edges of the through opening 16 are connected practically without a gap to the cover 23 and the body 22. In the scraping position illustrated in FIG. 3, this results in a smooth passage through the valve arrangement 12, i.e., a scraper can travel through the varnish line without there being the risk that the scraper is damaged. Simultaneously, in this scraping position, the bypass is closed, i.e., varnish cannot flow back from the auxiliary device 9 into the varnish line 2 and varnish which is removed from the varnish line cannot be pressed into this area.

In order to reach the operating position illustrated in FIG. 2, the slide 14 is moved transversely of the axis of the varnish line 2 with a stroke which corresponds at least to the diameter of the varnish line 2 plus a sufficient safety distance in order to reliably seal the varnish line 2 which is now closed relative to the through opening 16. Any varnish which arrives from the inlet end 6 through the section 6', enters the blind end bore 18 and is then conveyed through the bypass line 17 to the gears 10, 11 of the pump. From there, the varnish is conducted through the section 20 of the bypass line into the blind end bore 19 and through the section 7' to the outlet end of the varnish line 2.

Of course, an additional auxiliary device or even several additional auxiliary devices can be provided in the varnish line 2.

In the illustrated embodiment, the valve arrangement 12 includes a single valve which facilitates feeding of the varnish out of the actual varnish line as well as feeding of the varnish into the line. However, it is easily conceivable that also two valves can be used, wherein one valve ensures that the varnish is conveyed from the varnish line to the auxiliary device, while the other valve assumes the complementary function and feeds the varnish from the auxiliary device back into the varnish line 2. In that case, each of the valves has a corresponding through opening 16, and a scraper can be moved without being damaged through both valves.

When a varnishing process with one varnish is concluded and another varnish, for example, with a different color, is to be used, the slide 14 is pushed into the scraping position illustrated in FIGS. 3 and 4 until the through opening 16 again releases the cross-section of the varnish line 2. A scraper can then be pushed from the outlet end 7 to the inlet end 6 and the scraper pushes the varnish out of the line as a result.

Subsequently, a rinsing process is required in which it is useful to push the slide once again back into the operating position shown in FIG. 2, so that the auxiliary device can also be cleaned by means of the rinsing agent. Of course, it is also possible to provide a separate rinsing means for the auxiliary device 9.

While specific embodiments of the invention have been shown and described in detail to illustrate the inventive principles, it will be understood that the invention may be embodied otherwise without departing from such principles.

We claim:

1. A varnishing installation comprising a varnish line having an inlet end, an outlet end and an auxiliary device, and a valve arrangement for connecting the auxiliary device to the varnish line, wherein the auxiliary device is not scrapeable and the valve arrangement is scrapeable.

2. A varnishing installation comprising a varnish line having an inlet end, an outlet end and an auxiliary device, and a valve arrangement for connecting the auxiliary device to the varnish line, wherein the valve arrangement is scrapeable, and wherein the valve arrangement is switchable into a scraping position in which the valve arrangement forms a passage between two sections of the varnish line whose walls are smooth.

3. The installation according to claim 2, wherein the passage has at each end thereof a cross-section which is the same as the cross-sections of the sections of the varnish line connected to the passage.

4. The installation according to claim 2, wherein the valve arrangement comprises a slide valve with a slide movable in a housing, the slide having a through opening forming the passage.

5. The installation according to claim 4, wherein the through opening is connected without a gap to the varnish line.

6. The installation according to claim 4, wherein at least one branch line is provided in the slide, wherein, in an operating position of the slide, the branch line is in communication with the varnish line.

7. The installation according to claim 6, wherein the slide, in the operating position thereof, closes the varnish line.

8. The installation according to claim 6, wherein two branch lines are provided in the slide, wherein the branch lines are in communication with the varnish line on opposite sides.

9. The installation according to claim 6, wherein the at least one branch line is in communication with a blind end bore provided in the slide.

10. The installation according to claim 4, further comprising a parallel guide means for guiding the slide in the housing.

11. The installation according to claim 4, wherein the slide comprises at least one stop, wherein the stop is positioned such that, in the scraping position, the passage is with a predetermined accuracy in alignment with the cross-section with the varnish line.

12. The installation according to claim 11, wherein the stop is comprised of a pin guided in an oblong groove of the slide.

13. The installation according to claim 4, further comprising a sealing arrangement acting relative to the slide, wherein the sealing arrangement is arranged in the housing.

14. The installation according to claim 13, wherein the sealing arrangement comprises a first sealing member surrounding ends of the varnish line, and a second sealing member surrounding a housing area in which portions of the slide are located which are brought in alignment with the varnish line when the slide is adjusted.

* * * * *